Jan. 14, 1947.   R. C. TOWNSEND   2,414,248
VEHICLE TRAILER HITCH
Filed April 22, 1944
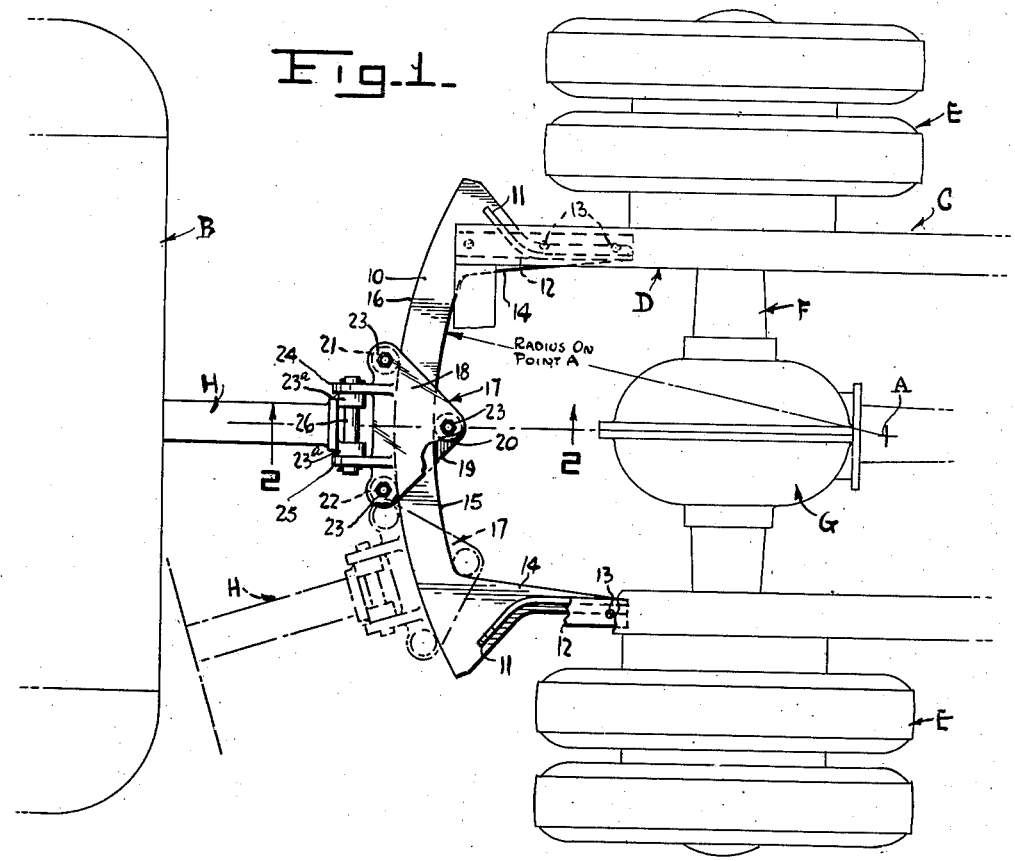
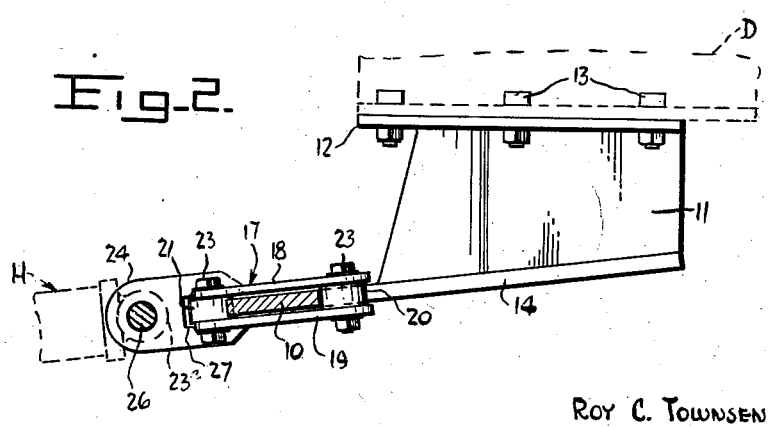
Inventor
Roy C. Townsend
By Carlsen + Hayle
Attorneys Patented Jan. 14, 1947

2,414,248

UNITED STATES PATENT OFFICE 2,414,248

VEHICLE TRAILER HITCH

Roy C. Townsend, La Crosse, Wis.

Application April 22, 1944, Serial No. 532,313

9 Claims. (Cl. 280—33.44)

This invention relates to improvements in vehicle trailer hitches.

In the operation of tractor-trailer combinations there is frequently encountered a tendency for the towed unit or trailer to weave from side to side, which action interferes greatly with steering of the towing unit, tractor or automotive vehicle. This tendency is controllable by proper selection of the point at which the tongue or tow bar from the towed unit is attached to the towing unit and may be counteracted entirely if the connection may be made at the optimum point or location. This point in all cases is, however, located somewhere forwardly of the rear axle of the towing unit and it is difficult to reach this point with the tow bar or tongue, due to the interference therewith of the large transmission housing centrally located on the rear axle. Obviously the tow bar must swing on a radius centered on the point at which the draft is applied to the towing unit to permit proper steering, and in order to clear the transmission housing the bar must be located either thereabove, in which case the draft line is too high for best operation and interference is encountered from the framing and body of both towing and towed units, or the tow bar must be located beneath the transmission in which case inadequate road clearance results.

Having in mind these facts it is the primary object of my invention to provide a hitch mechanism by means of which the effective point at which the draft line centers on the towing unit may be made to coincide with the optimum point, without requiring that any parts of the hitch pass forward of the rear axle and transmission housing of the vehicle. Another object is to provide a hitch by means of which optimum draft lines may be obtained in both vertical and horizontal planes, with complete freedom for swinging movement of the tow bar as necessary for proper steering of the towing unit and proper trailing of the towed unit.

These and other more detailed and specific objects will be disclosed in the course of the following specification, reference being had to the accompanying drawing, in which—

Fig. 1 is a fragmentary plan view of towing and towed units showing my improved hitch associated therewith.

Fig. 2 is an enlarged fragmentary longitudinal sectional view along the line 2—2 in Fig. 1.

Referring now more particularly and by reference characters to the drawing, I show my invention as applied therein for connecting a towed unit, or trailer, B to a towing unit, tractor, truck or similar automotive vehicle C. Of the latter only the chassis or frame D, rear wheels E, axle F and transmission housing G are shown. The trailer B is shown as provided with a forwardly extending tow bar or tongue H by which draft connection is made to the towing unit, or truck C.

It is known to those skilled in the art that the ideal point for connecting the forward end of the tow bar H to the truck C, is located on the longitudinal center line of the truck and forwardly of the center line of the rear axle F thereof. This point is indicated for example at A in Fig. 1. If the connection is made directly to the rear of the truck frame, or anywhere rearwardly of this ideal point A then there is a pronounced tendency for the trailer B to weave from side to side, interfering greatly with steering. Obviously the necessarily large transmission housing G, and its driving and axle connections, interferes greatly with, and in most cases prohibits, the extension of the tow bar H forwardly thereof for connection to the point A, particularly when it is considered that the tow bar must in operation oscillate transversely about a pivot connection at its forward end in order to permit of proper steering and trailing of the tractor-trailer combination. The pivot A may be termed the neutral point, since the draft connection thereat tends to neutralize weaving tendencies of the trailer.

In accordance with my invention I provide means whereby the effective draft line may be centered about neutral point A, without requiring that any mechanical parts of the hitch extend forward of the rear axle and transmission housing of the tractor, so that interference and obstruction to proper operation from these parts is no longer a factor in the hitch design. To this end I provide a sector-like draw bar or plate 10 supported crosswise at the rear of the truck or vehicle frame D, by means of upright web members 11 welded or otherwise suitably secured to the ends of the bar and to mounting plates 12 which are secured beneath the side member or beams of the frame D by bolts 13 or the like. The draw bar 10 is arcuate and is curved on a radius centered on the neutral point A as clearly indicated. The ends supported by the web member 11, as aforesaid, are forwardly turned as indicated at 14 providing stop means at each end of the draw bar. The curved front and rear edges 15 and 16 of the bar 10 are parallel throughout their length, within the lateral limits of the forwardly turned ends 14, and the rear edge 16 further extends, at the same curvature, well beyond the ends 14 in lateral directions as clearly shown.

Connection between the tow bar H and the draw bar or member 10 is made through a transversely movable hitch member, designated generally at 17, which comprises upper and lower triangular plates 18 and 19 disposed respectively above and below the bar 10. Rollers 20, 21 and 22 are arranged between the plates 18 and 19 at the three corners thereof and are journaled upon suitable pins or bolts 23 which also aid in holding the plates together. One roller 20 is disposed centrally and forwardly of the draw bar 10, to ride the forward edge 15 thereof, while the other two rollers 21 and 22 are disposed in transversely spaced and spread relation rearwardly of the draw bar to roll along its rear edge 16.

The forward end of the tow bar H is provided with transversely apertured lugs 23ª adapted to fit between rearwardly extending ears or attaching members 24 and 25 secured, as by welding, to the plates 18 and 19 in transversely spaced relation. A pin 26 is passed through suitable apertures in the ears 24 and 25, and through the lugs 23ª, to complete the connection. As here shown the forward ends of the ears 24 and 25 are bifurcated, as indicated at 27, to straddle rear edge portions of the plates 18 and 19 between the rollers 21 and 22.

The foregoing connections provide, as will be readily evident, for the transmission of the draft from the truck C to the trailer B while permitting the tow bar H to swing freely in a transverse plane as required in the steering and travel of the combination. Such movements of the tow bar H are permitted by the travel of the hitch 17 along the draw bar 10 and inasmuch as the curvature of the draw bar is determined by a radius struck from the optimum or neutral point A, as aforesaid, the effective line of draft is at all times centered about said point, as required to neutralize weaving tendencies of the trailer. However, no parts of the hitch are required actually to extend forward of, or even close to, the transmission G, so that interference therefrom with the proper mounting and operation of the hitch is completely eliminated.

Thus, not only is it possible to secure an ideal effective draft connection in the horizontal plane, but in the vertical plane as well the parts may be arranged without reference to conditions imposed by passing over or beneath the rear axle of the towing unit, so that adequate road clearance, with an optimum low draft line may be attained.

The transverse shifting movements of the hitch 17 are, as seen in broken lines in Fig. 1, limited by the ends 14 of the draw bar 10 but in all positions three point support between the hitch and the draw bar is provided by the three rollers riding the edges of the bar, to prevent binding under any circumstances.

It will be noted in Fig. 2 that the draw bar 10 may be disposed at any angle required to properly meet the tow bar H, by the proper shaping of the web members 11. By angling the ends 14 of the draw bar the same result might be achieved.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A hitch for making a draft connection between a towing unit and a towed unit, the said towing unit having a rear axle and the towed unit having a draft tongue, comprising in combination, a drawbar secured crosswise to the towing unit rearwardly of the rear axle thereof, a hitch member attached to the draft tongue of the towed unit, the said draw bar having front and rear transversely extending parallel and arcuate edges curved on a radius centered about a point located forward of the rear axle of the towing unit and the said rear edge being longer than the front edge and extending endwise beyond the corresponding ends thereof, the said hitch member having upper and lower plates between which is journaled a single forward roller adapted to travel along the front edge of the draw bar and a pair of wide spaced rollers adapted to travel along the rear edge of the draw bar, ears secured to and joining the rear edges of the hitch plates and extending rearwardly therefrom alongside the forward edges of the draft tongue, and a pin connecting the ears to the tongue and allowing pivotal movements therebetween only in an upright plane.

2. A drawbar construction of the character described for making a draft connection to a towing vehicle having a rear axle and chassis side frame parts extending horizontally rearward thereof, comprising a drawbar disposed crosswise beneath the frame and having its lateral extremities turned forwardly therebeneath, web members welded on edge upon the forwardly turned extremities of the drawbar, and mounting plates welded horizontally and flatwise upon the upper edges of the web members and adapted to be secured to the said side parts of the frame rearwardly of the rear axle of the vehicle.

3. A drawbar construction of the character described for making a draft connection to a towing vehicle having a rear axle and chassis side frame parts extending horizontally rearward thereof, comprising a drawbar disposed crosswise beneath the frame and having its lateral extremities turned forwardly therebeneath, web members welded on edge upon the forwardly turned extremities of the drawbar, and mounting plates welded horizontally and flatwise upon the upper edges of the web members and adapted to be secured to the said side parts of the frame rearwardly of the rear axle of the vehicle, the said web members being wider in the vertical direction at their rearwardly disposed ends to thereby tilt the drawbar in a rearward and downwardly sloping direction.

4. A hitch for connecting a towed unit to a vehicle comprising an arcuate draw bar secured to and extending transversely of the vehicle and with its arc disposed rearwardly of the arc center, a hitch member mounted on the draw bar for movement lengthwise thereof, a draft tongue extending from the towed unit and connected to the hitch member with the vertical longitudinal plane of the tongue passing through said arc center, the connection between said hitch member and draft tongue being such as to restrain the draft tongue from lateral movement with respect to said vertical plane while permitting the hitch member and the draft tongue to move lengthwise with respect to the draw bar and about the arc center thereof.

5. A hitch for connecting a towed unit to a vehicle comprising an arcuate draw bar secured to and extending transversely of the vehicle and with its arc disposed rearwardly of the arc center, a hitch member mounted on the draw bar for movement lengthwise thereof, a draft tongue extending from the towed unit and connected to the hitch member with the vertical longitudinal plane of the tongue passing through said arc center, the connection between the draft tongue and hitch member being operative to maintain the draft tongue in longitudinal vertical plane alignment with the hitch member and with said arc center while permitting vertical swinging movement of the tongue in said plane whereby transverse movement of the tongue will operate to move the hitch member on the drawbar with the vertical longitudinal plane of the draw bar constantly passing through the said center of the draw bar arc.

6. A hitch for connecting fore and aft vehicles, comprising a rearwardly curved transversely disposed draw bar carried by the front vehicle, a hitch member movable lengthwise on the draw bar while being restrained from any other relative movement with respect thereto, and a draft tongue extending from the rear vehicle with its forward end connected by a transverse pivot to the hitch member whereby the tongue may swing vertically with respect to the hitch member, said transverse pivot connection being operative to maintain alignment of the tongue with the hitch member in a vertical longitudinal plane whereby any transverse swinging movement of the tongue will simultaneously move the hitch member lengthwise on the draw bar to either side with respect to the direction of travel.

7. A hitch for connecting fore and aft vehicles, comprising a rearwardly curved transversely disposed draw bar carried by the front vehicle, a hitch member movable lengthwise on the draw bar while being restrained from any other relative movement with respect thereto, and a draft tongue extending from the rear vehicle with its forward end connected by a transverse pivot to the hitch member, whereby the tongue may swing vertically with respect to the hitch member, said transverse pivot connection being operative to restrain transverse swinging of the tongue with respect to the hitch member whereby transverse movement of the tongue will simultaneously move the hitch member lengthwise on the draw bar to either side with respect to the direction of travel, said hitch member having draft contact with the draw bar through rollers mounted in the hitch member for engagement with front and rear edges of the draw bar.

8. A vehicle hitch comprising a transversely extending rearwardly curved draw bar for mounting on the rear of the vehicle, a member mounted on the draw bar for movement lengthwise thereon but restrained against other movement with respect thereto, a draft tongue extending rearwardly from said member for connecting with a towed unit, said draft tongue being connected to said member by a transverse pivot which will permit the tongue to swing vertically while causing the tongue, when moved transversely, to correspondingly move the member on the draft bar.

9. A hitch for connecting fore and aft vehicles, comprising a rearwardly and arcuately curved transversely disposed draw bar rigidly carried by the front vehicle, a hitch member movable lengthwise on the draw bar while being restrained from any other relative movement with respect thereto, and a draft tongue extending from the rear vehicle in radial alignment with the center of the draw bar arc and with its forward end connected by a transverse pivot to the hitch member, whereby the tongue may swing vertically with respect to the hitch member in a vertical plane passing through said arc center, said pivot connection being operative to maintain said radial alignment of the draft tongue with the arc center during movement of the hitch member lengthwise on the draw bar to either side with respect to the direction of travel.

ROY C. TOWNSEND.